Feb. 14, 1961 E. J. BARLOW ET AL 2,972,141

SYSTEM AND METHOD FOR REMOTE RADAR DATA TRANSMISSION AND COORDINATED ASSEMBLY AT A CENTRAL STATION

Filed June 15, 1956 7 Sheets-Sheet 1

INVENTORS
EDWARD J. BARLOW, JOHN D. MALLETT, SIDNEY BERTRAM, JOHN I. DASPIT
BY
[signature]
ATTORNEY Feb. 14, 1961 E. J. BARLOW ET AL 2,972,141

SYSTEM AND METHOD FOR REMOTE RADAR DATA TRANSMISSION
AND COORDINATED ASSEMBLY AT A CENTRAL STATION

Filed June 15, 1956 7 Sheets-Sheet 2

INVENTORS
EDWARD J. BARLOW, JOHN D. MALLETT,
SIDNEY BERTRAM, JOHN I. DASPIT,
BY
[signature]
ATTORNEY

200

INVENTORS
EDWARD J. BARLOW, JOHN D. MALLETT,
SIDNEY BERTRAM, JOHN I. DASPIT,
BY
[signature]
ATTORNEY INVENTORS
EDWARD J. BARLOW, JOHN D. MALLETT,
SIDNEY BERTRAM, JOHN I. DASPIT,
BY [signature]
ATTORNEY SYSTEM AND METHOD FOR REMOTE RADAR DATA TRANSMISSION
AND COORDINATED ASSEMBLY AT A CENTRAL STATION INVENTORS
EDWARD J. BARLOW, JOHN D. MALLETT
SIDNEY BERTRAM, JOHN I. DASPIT
BY
ATTORNEY INVENTORS
EDWARD J. BARLOW, JOHN D. MALLETT,
SIDNEY BERTRAM, JOHN I. DASPIT,
BY
Edward [signature]
ATTORNEY INVENTORS
EDWARD J. BARLOW, JOHN D. MALLETT,
SIDNEY BERTRAM, JOHN I. DASPIT.
BY
Edward A. Kendrick
ATTORNEY 2,972,141

SYSTEM AND METHOD FOR REMOTE RADAR DATA TRANSMISSION AND COORDINATED ASSEMBLY AT A CENTRAL STATION

Edward J. Barlow and John D. Mallett, Pacific Palisades, Sidney Bertram, Los Angeles, and John I. Daspit, Santa Monica, Calif., assignors to Gilfillan Bros., Inc., Los Angeles, Calif., a corporation of California Filed June 15, 1956, Ser. No. 593,011

19 Claims. (Cl. 343—5)

Figure 1:
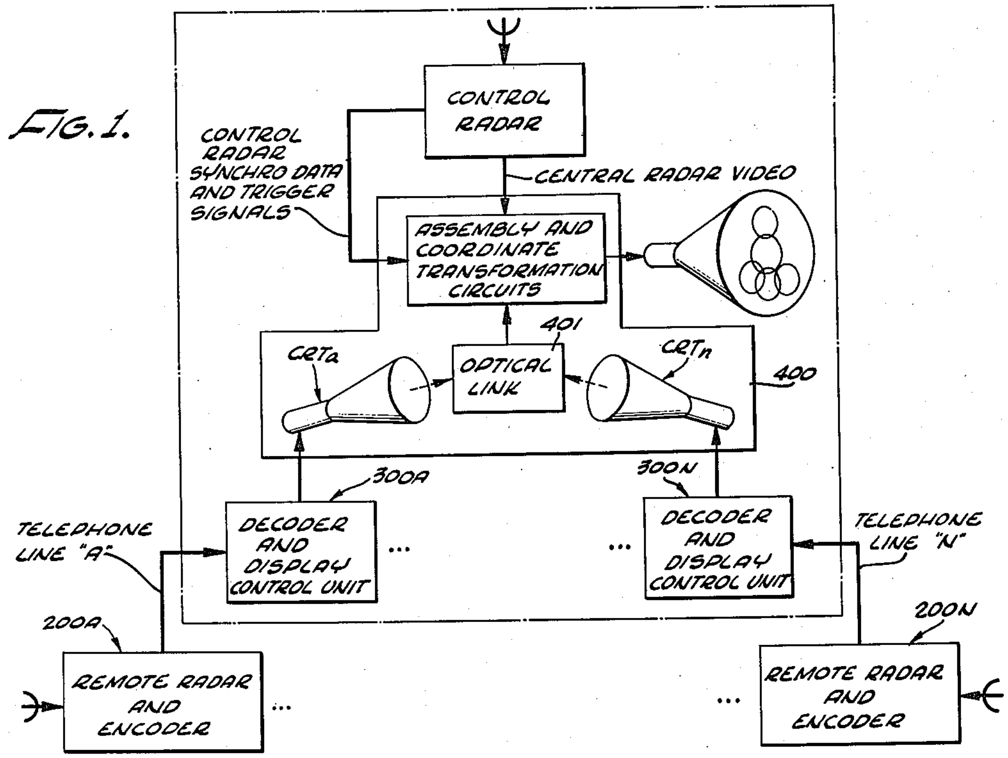

This invention relates to a system and method for remote radar data transmission and coordinated assembly at a central station and, more particularly, to a system and method for transmitting radar data from remote radars over telephone lines to a central station where the information received is transformed into video data in the coordinates of the central station.

The present invention may be utilized to provide a coördinated central radar display covering a wide area, where a plurality of remote radars provide data in respective sections. Thus the invention allows a considerable expansion in the effective radar range from a central station while retaining a high degree of target resolution.

In another aspect the invention provides an efficient solution to the data assembly problem inherent in any radar network where a plurality of radars are required to scan separate areas. Thus the invention may find particular application in a ground controlled approach system where certain approaches are invisible from the central installation due to interfering terrain. In this particular situation the invention may be utilized to provide a remote radar installation which can detect targets in areas which are "blind" to the central station, providing signals which may be transmitted for coordinate transformation and utilization at the central station.

The invention is efficiently adapted for use in a system where signals transmitted by narrow band telephone facilities (or other narrow band media) may be accepted at a central station and converted to radar display information. The technique introduced by the invention makes it possible to transmit radar information without the necessity of costly microwave facilities which would normally be required for transmitting video signals existing in a broad frequency band. Effectively the method of the invention "compresses" the radar video information into a band pass region which is suitable for transmission through existing telephone facilities.

Perhaps the most important contribution of the invention is a method of data assembly and coordinate transformation which may be practiced with a relatively simple circuit arrangement. The method provided is especially desirable since it requires no interaction between the two radars. According to the invention, the coordinate transformation is achieved by first creating remote PPI pictures (i.e., reproduced at a distant point) on individual cathode ray tubes and then arranging the several pictures for simultaneous viewing. The mechanical positioning of the individual PPI displays thus accomplishes the conversion of individual radar coordinates to a geographically correct display.

The assembled optical display is then scanned in synchronism with the coordinate system of the local radar, using the synchro data and trigger signals available. The video signals from the scanning device are then introduced into the video signal lines of the local radar and are thereafter handled as if they were signals picked up by the local radar. The scanning device and/or the optical display medium includes a storage or memory characteristic which allows complete independence of the radar equipments.

The storage or "memory" characteristic is selected so that sufficient time is allowed to complete a scanning cycle at the central radar rate, during the storage delay time. Thus if the assembly is to consist of a PPI display, the storage characteristic of either the optical display or the scanning device must correspond to the azimuth scanning rate which may be of the order of magnitude of 15 seconds for 360°. Furthermore, the scanning rate, and consequently the storage characteristic, must be selected on the basis of an expected rate of information change so that the delay resulting from asynchronous scanning, according to the invention, does not result in a loss of necessary information.

Thus where the target velocity is relatively high, the central radar scanning rate must be adjusted to compensate for the fact that the utilization of a storage medium according to the invention introduces a lag in information translation.

However, in practice these requirements place no practical restriction upon the invention and, as a result, an extremely efficient transformation technique is available requiring relatively simple circuits which need not be synchronized.

The storage concept allowing asynchronous operation at the central station may also be utilized to encode video data at the remote radar installations where the added feature of bandwidth compression may be achieved in a manner more fully described in copending U.S. patent application Serial No. 593,016 for "Video Data Encoding Circuit and Method Allowing Bandwidth Compression," by John Ignatius Daspit, filed June 15, 1956. The subcombinational aspects of the present system are claimed in this copending application. Another suitable encoding technique is described in an article entitled "Narrow Band Link Relays Radar Data," by John L. McLucas, Elctronics, volume 25, number 9, (September 19, 1952) published by McGraw-Hill Publishing Co., Inc.

In its basic structural form a typical system provided by the invention includes the following components. A plurality of remote radar and encoder circuits are included for translating received video information into "compressed" data suitable for transmission through narrow band facilities such as telephone lines. The "compressed" signals provided by the encoders are then decoded at a central station through respective circuits which may also be utilized to provide control signals for actuating a display device such as a cathode ray tube.

The decoded and displayed information is then arranged physically in accordance with the geographical location of the corresponding information received. This physical arrangement then is scanned to provide a superimposed assembly where all coordinates are effectively translated to the central station. Finally, the system of the invention includes means for scanning the assembled optical display to translate this display into what may be considered to be simulated radar video signals representing the remote radar data. These signals then may be combined with the video signals of the central radar and used to provide a composite display. In effect the coverage of the local radar has been augmented by the data from the remote gap-filling radars.

While the invention may assume a multitude of particular arrangements, a preferred form of encoding device providing the desired bandwidth compression is described in the above-mentioned copending application by John Ignatius Daspit. In this circuit a vidicon having a storage characteristic corresponding to the azimuth scanning rate at the remote station is utilized to scan a radar "B" display translate the display into "compressed" video signals. The scanning rate of the vidicon may be selected so that the bandwidth of the signal information resulting is well within that of a conventional telephone line. The vidicon has the further feature in that its storage characteristic allows the retention of a display for a time interval which is greater than the typical azimuth scanning interval obviating the necessity of an additional storage device or storage characteristic in the display tube.

Furthermore, this type of optical encoding is desirable since it allows a display at the remote radar which may provide information for utilization at the location and therefore additional radar displays are not required.

As described herein the vidicon scanning is utilized at the central station where the vidicon receives the assembled optical display of the remote radars, although other image scanning devices may be employed, such as the image orthicon, provided that a suitable storage characteristic present. In this situation the remote radar information may be translated into a corresponding plurality of separate PPI displays which are arranged with their center of scan in accordance with respective geographic locations, and with zero azimuth lines in the proper orientation. The vidicon then is utilized to scan this presentation according to the central radar synchro trigger signals so that effectively the output signals produced by the vidicon may be considered to be target echoes based on the central radar coordinates and therefore may be directly mixed with central radar video derived independently.

A more specific technique of the invention is in the provision of certain visual marks on the radar display utilized which obviate the necessity of generating reference signals such as zero-azimuth-indicating or zero-range-trigger signals, by displaying these marks visually at predetermined positions. In this manner the scanning device, which may be a vidicon, automatically generates the proper reference signals along with any radar data which is to be transmitted.

Accordingly, it is an object of the present invention to provide an efficient solution to the data assembly problem inherent in any radar network where a plurality of radars are required to scan separate areas.

Another object of the invention is to provide a system for transmitting radar data from remote radars over narrow band facilities to a central station where the information received is to be transformed into data based upon the coordinates of the central station.

A further object of the invention is to provide a coordinated central radar display covering a wide area where a plurality of remote radars provide data in respective sections.

Yet another object is to provide a radar system where remote radar installations can detect targets in areas which are blind to the central station providing signals which may be transmitted for coordinate transformation and utilization at the central station.

Still a further object is to provide a system of radar data assembly wherein the complexity of mechanical or electronic synchronization between central and remote radars is obviated.

A more specific object of the invention is to provide a system for radar data assembly where existing narrow band telephone facilities may be utilized to transmit remote radar information to a central station, obviating the necessity of costly microwave facilities which would normally be required for transmitting video signals existing in a broad frequency band.

Another specific object is to provide a system for data transmission and coordinated assembly where synchronism between encoding and decoding devices is not required due to utilization of a storage medium to retain remote data for a period corresponding to the scanning cycle at the point of assembly.

Yet another specific object is to provide a system for data transmisison and assembly where complicated coordinate transforming circuits or computers are not required, the transformation being achieved by optically superimposing remote data in transformed position and then scanning the resulting optical display in accordance with central reference signals such as radar trigger and synchro signals.

A further specific object is to provide an efficient solution to the data coordinate transformation problem without requiring synchronization between remote and central radars through the utilization of a vidicon or other TV camera, having storage charactristics, to scan an optical display of superimposed remote radar displays positioned in accordance with their respective geographical locations.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 1A:
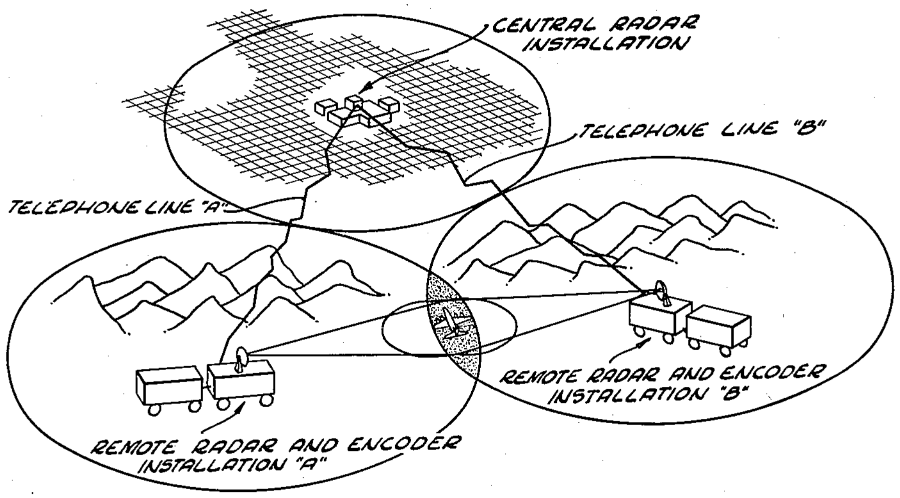
Figure 2A:
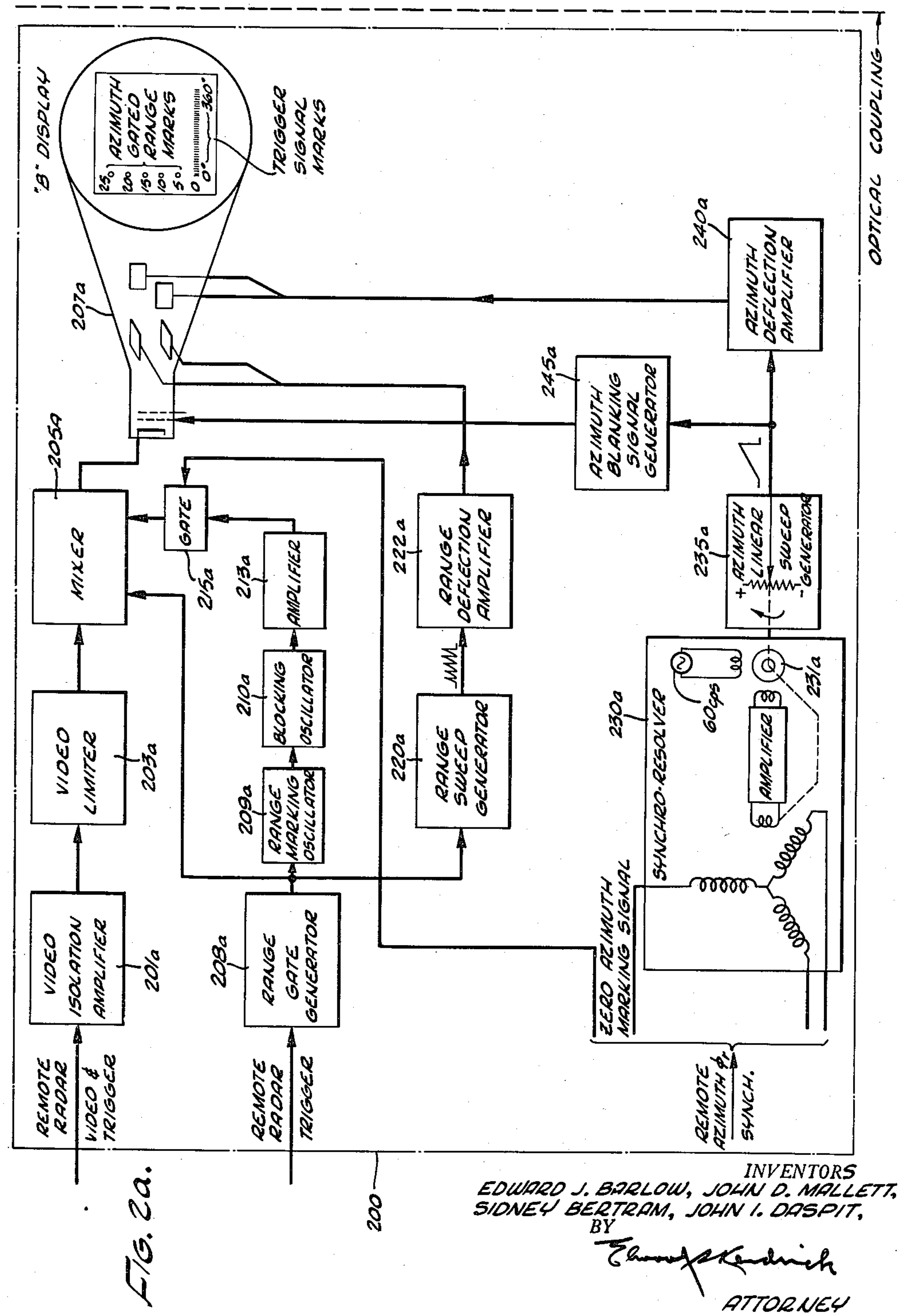
Figure 2B:
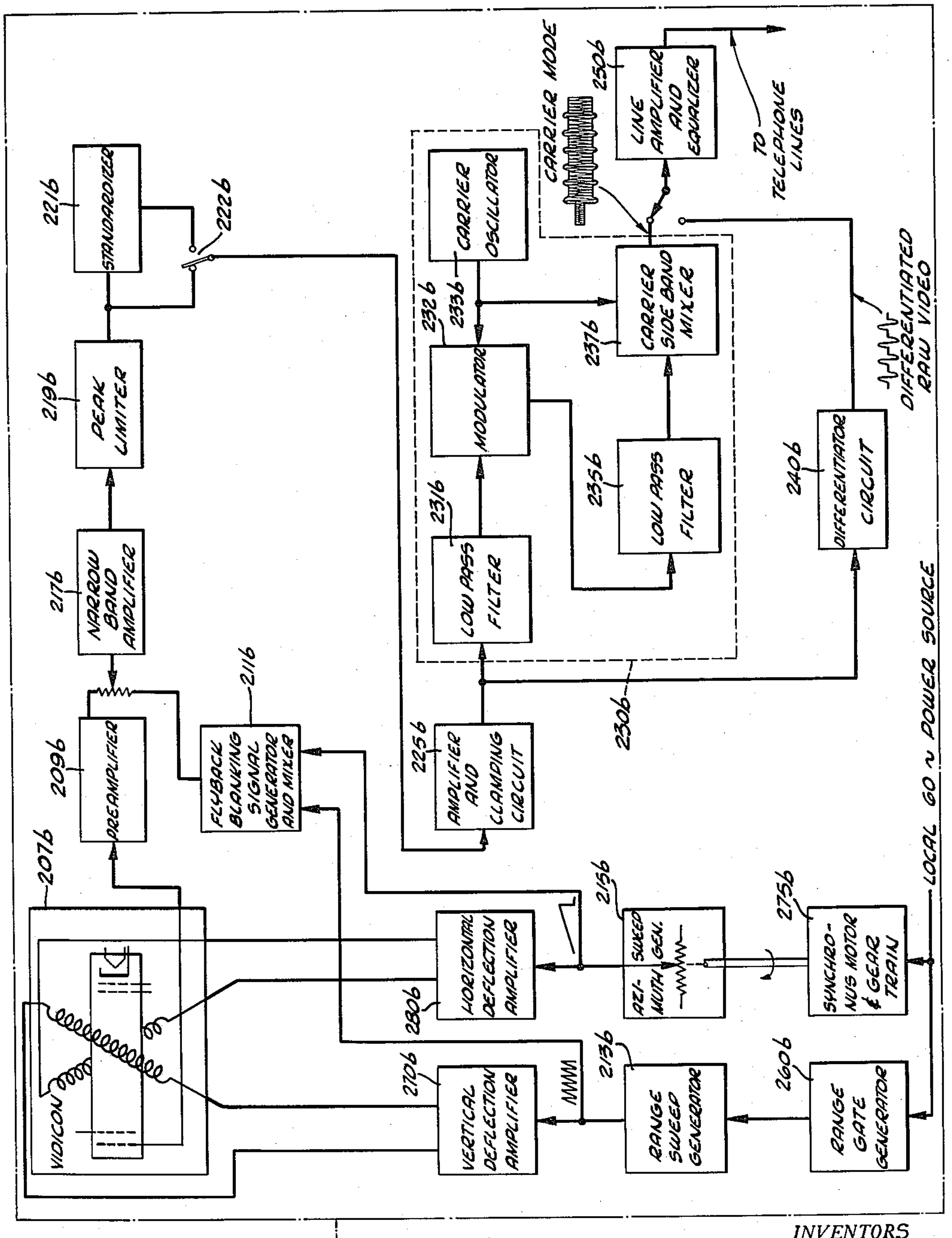
Figure 3:
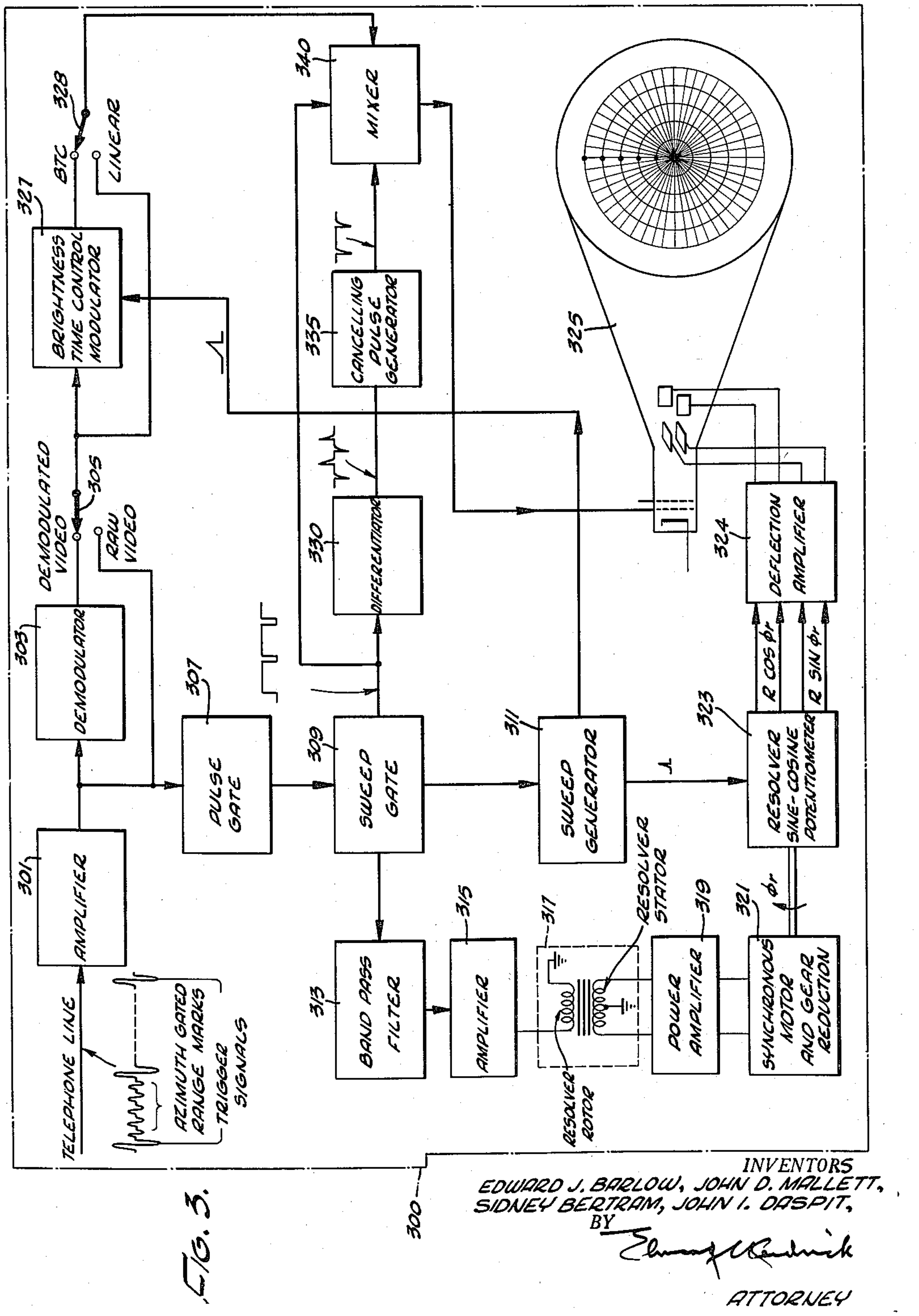
Figure 3A:
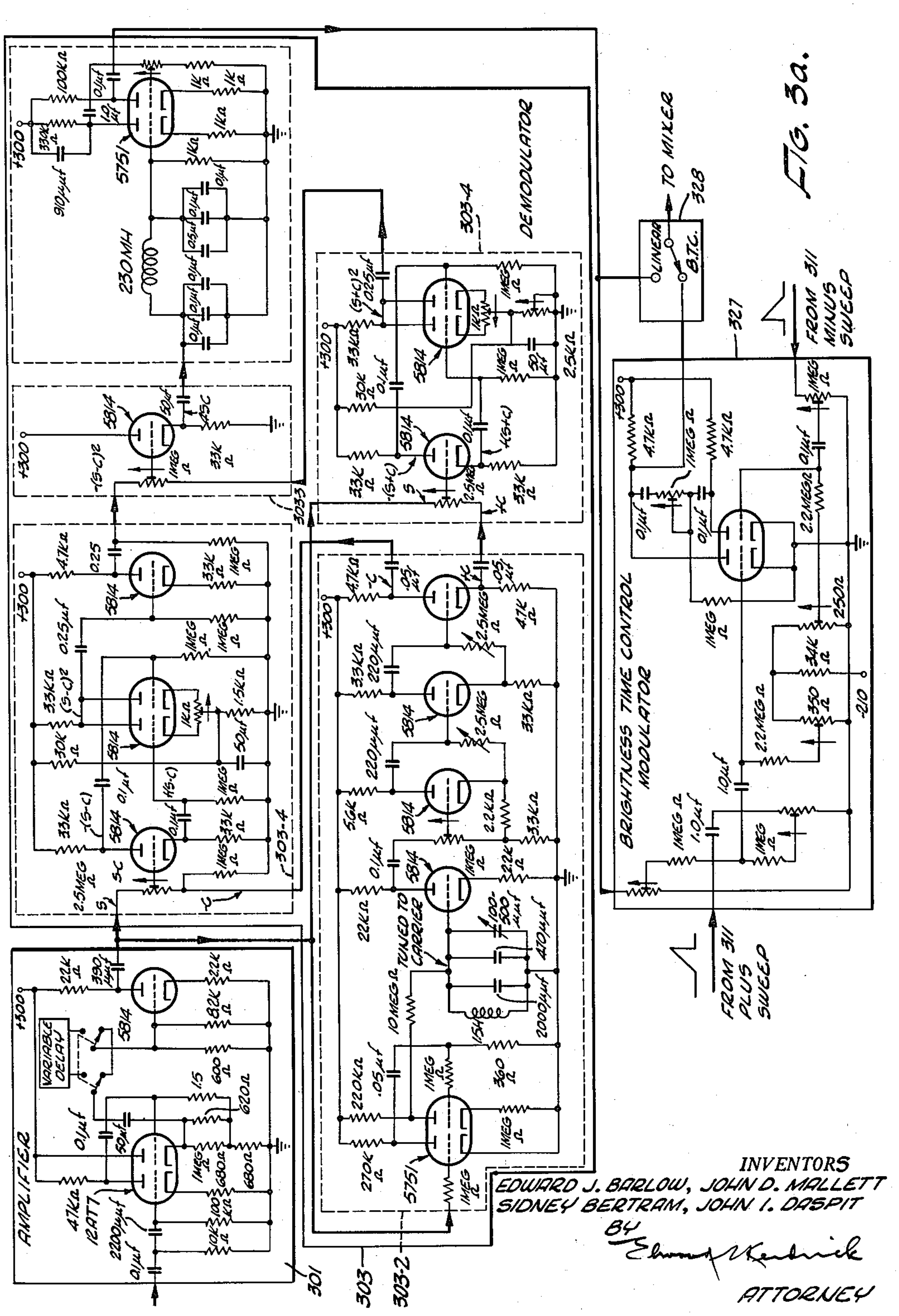
Figure 3B:
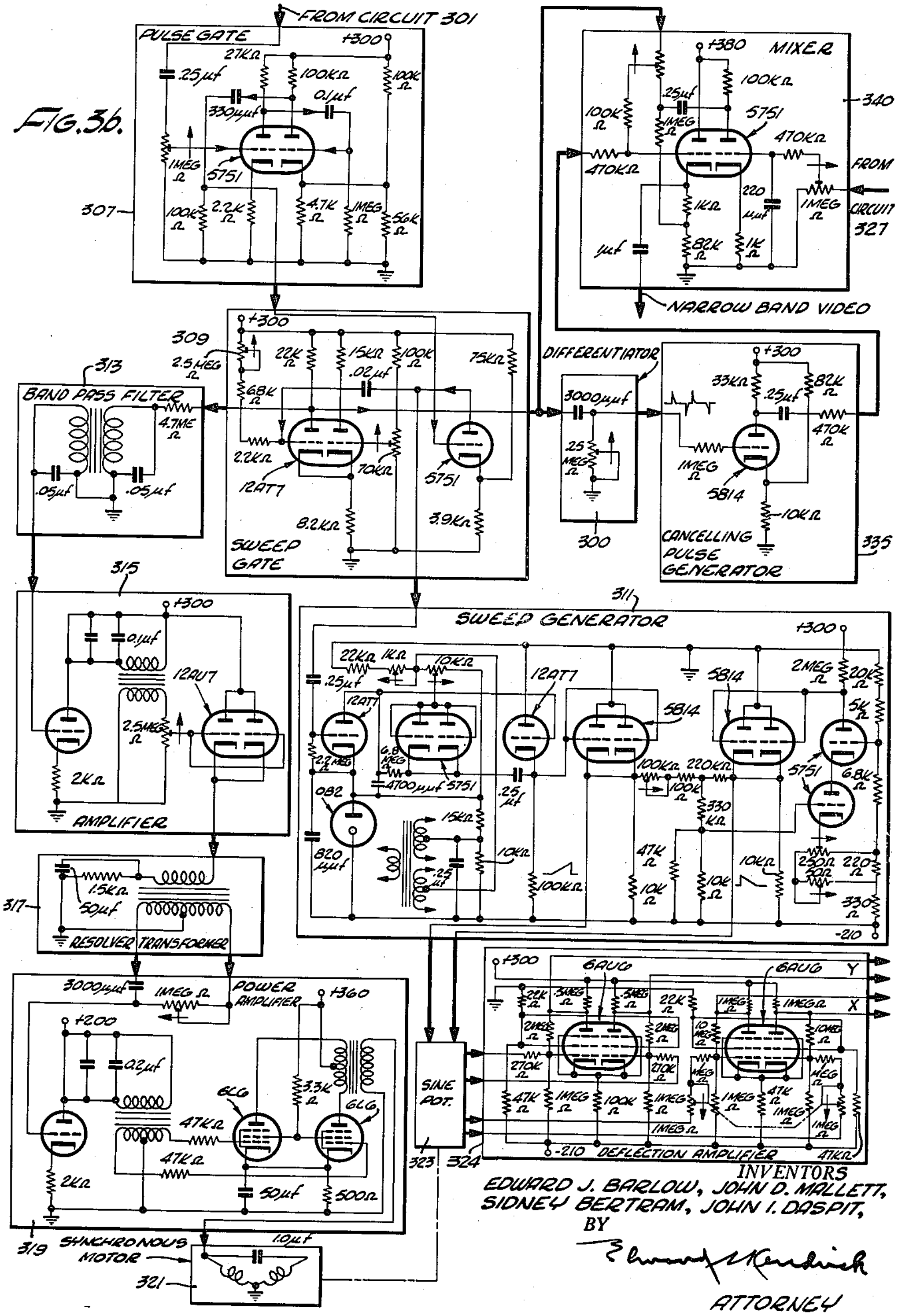
Figure 4:
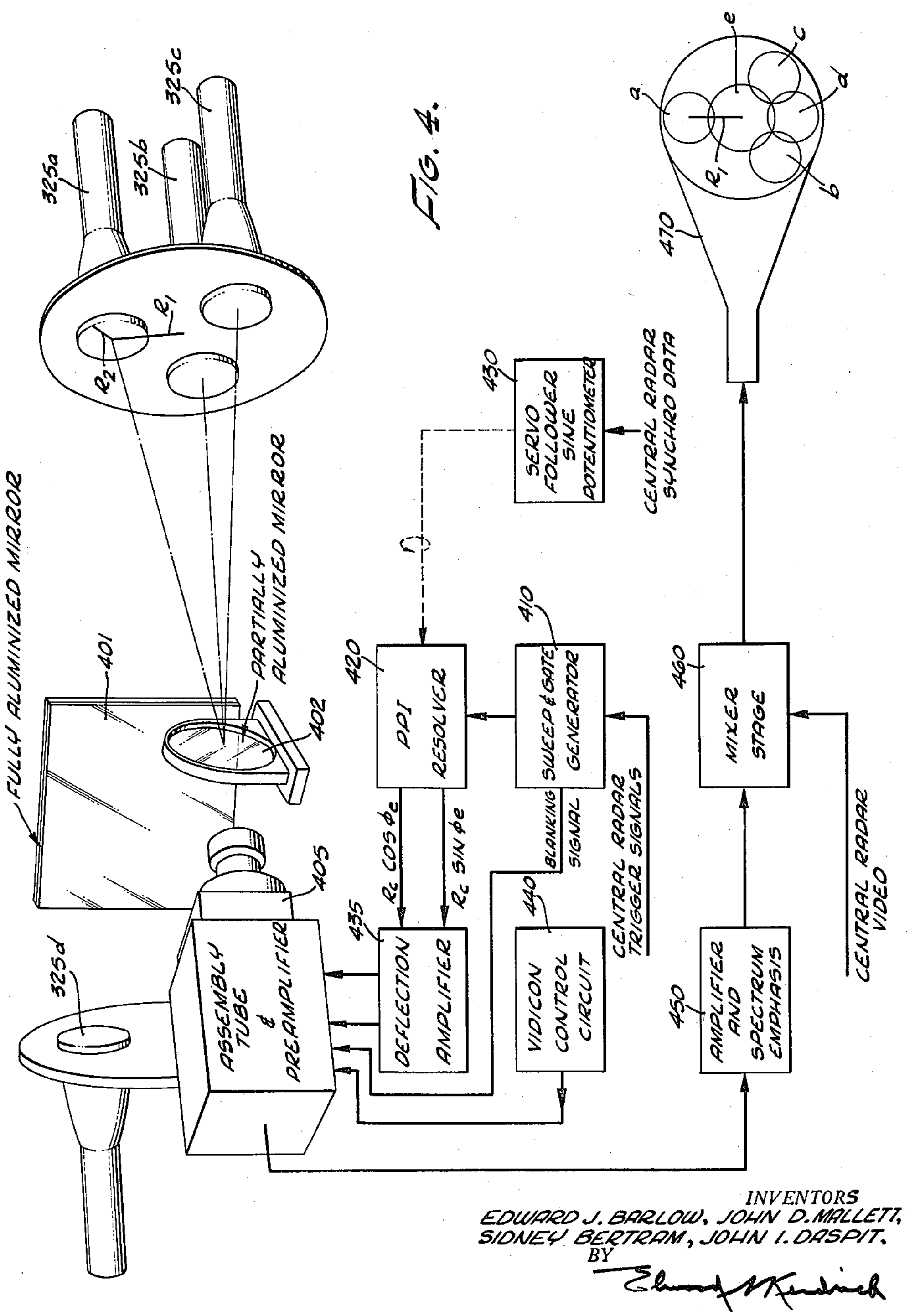

Fig. 1 is a block diagram of a basic embodiment of the invention;

Fig. 1*a* illustrates a typical geographical arrangement of the components forming the system of Fig. 1;

Figs. 2*a* and 2*b* illustrate one form of encoding circuit which may be utilized in embodiments of the invention;

Fig. 3 illustrates the general form of a decoding circuit which may be utilized in systems of the invention;

Figs. 3*a* and 3*b* are schematic diagrams illustrating a specific circuit arrangement constituting one form suitable for the decoding circuit of Fig. 3; and Fig. 4 illustrates a suitable arrangement for the assembly and coordinate transformation circuits of Fig. 1.

Reference is now made to Fig. 1 illustrating a typical arrangement of a system employing the principles of the present invention. As illustrated in Fig. 1, the system includes a plurality of remote radars and encoders 200A . . . 200N, where the reference letter "N" is utilized to indicate that any number may be employed depending upon the particular assembly problem involved.

The encoding circuits in devices 200 are arranged, according to the present invention, to "compress" video input signals representing corresponding data into a band pass region suitable for transmission via telephone lines. Information transmitted in this manner then is decoded and displayed under the control of corresponding signals in decoder and display control units 300A . . . 300N associated with encoders 200A . . . 200N, respectively. The signals produced by circuit 300A . . . 300N are applied to an assembly and coordinate transformation means 400 which provides for the optical display of received data in a manner providing the desired coordinate transformation. This optical display is then translated into corresponding data signals based upon the central installation coordinates and mixed with central radar video signals to form a composite set of signals representing a display based upon the central station coordinates.

A particular arrangement is indicated in Fig. 1 where cathode ray tubes CRT*a* and CRT*n* receive control signals from circuits 300A and 300N, respectively, and provide corresponding visual displays based upon the associated remote data received and decoded. These displays then are combined and optically transformed in accordance with central radar coordinates through an optical link which is scanned by means of a set of assembly and coordinate transformation circuits which may include a vidicon as pointed out above. Suitable forms for circuits 200, 300 and 400 are shown in Figs. 2, 3 and 4, respectively.

A typical situation where the invention may be practiced is illustrated in Fig. 1*a* where it will be noted that remote radar and encoder installations "A" and "B" exist behind interfering terrain such as mountains. Video data detected by the remote radar installations is compressed there and transmitted via corresponding telephone lines A and B to the central radar installation. This "compressed" video data then is translated through associated decoding devices and then optically transformed in coordinate position and finally translated into video data based upon the central radar synchro and trigger signals. Thus the display which may then be obtained at the central radar installation gives the impression that targets beyond the interfering mountain terrain are in fact visible from the central radar installation since the display provided is based upon the central radar coordinates.

*Encoder circuits 200*
(Shown in Figs. 2*a* and 2*b*)

In the preferred form of encoder as shown in Figs. 2*a* and 2*b* the circuit is separated into two sections corresponding to the two figures. The section shown in Fig. 2*a* provides a visual presentation of the remote radar and signals along with certain azimuth-gated range marks and trigger signal marks, as will be explained. The display provided by the circuits of Fig. 2*a* is then scanned asynchronously by the circuits of Fig. 2*b* which may include the vidicon circuit mentioned above. The practice of the invention requires that either the display device in the circuits of Fig. 2*a* or the scanning means in the circuits of Fig. 2*b* have a storage characteristic having a decay time which is long enough to retain a visual presentation of a complete scanning cycle which may, for example, be an entire azimuth scan of 360°.

In the particular arrangement of Fig. 2 it may be assumed that the vidicon includes the required storage characteristic and retains a charge pattern corresponding to the display provided by the circuits of Fig. 2*a*.

In general the display control circuits shown in Fig. 2*a* may be conventional circuits such as are described on pages 534 through 589 of a book entitled "Radar Engineering," by Donald G. Fink, published in 1947 by the McGraw-Hill Book Company, Inc., New York and London. However, certain important modifications will be noted which are introduced for the purposes of the present invention.

Thus in Fig. 2*a* it will be noted that remote radar video as well as trigger signals are passed through a video isolation amplifier 201*a*, a video limiter 203*a* and a mixer stage 205*a* to a cathode ray tube display device 207*a*. This is not conventional practice since normally the trigger signals would be eliminated to prevent the appearance of corresponding marks in the presentation. However, these marks are retained for the purpose of the present invention so that reference signals are automatically generated in scanning by means of the circuits of Fig. 2*b* at the scanning rate of the vidicon or other device utilized so that it is unnecessary to introduce such reference signals by electronic means.

It will also be noted that range-marking signals produced under the control of the range gate generator 208*a*, actuating a range-marking oscillator 209*a*, having its signals sharpened through a blocking oscillator stage 210*a*, and an amplifier 213*a* are applied to a gate 215*a*. Gate 215*a* is controlled by a reference-azimuth-marking signal, which may indicate zero azimuth, so that range marks appear on the display only during the reference azimuth marking interval. This procedure therefore provides range marks and a reference azimuth mark which are then automatically encoded in the scanning operation of the circuits of Fig. 2*b*, without any synchronization being required between these circuits and those of Fig. 2*a*.

The display-control circuits of Fig. 2*a* operate in a conventional manner and therefore will be only briefly described. It will be noted that the range gate generator signals also control a range sweep generator 220*a* which actuates a range deflection amplifier 222*a* controlling the vertical deflection plates of tube 207*a*. In a similar manner, azimuth sweep signals are derived in a conventional manner from a synchro-resolver arrangement 230*a* where a motor 231*a* is positioned in angle in accordance with the remote radar azimuth angle $\phi_r$. The motor 231*a* is coupled to an azimuth linear sweep generator 235*a* which is indicated to be a potentiometer with a rotatable center tap referred to in the art as a direction-sweep potentiometer such as is shown in Fig. 415 on page 561 of the above-mentioned reference by Donald G. Fink. The resulting azimuth sawtooth signal is applied to an azimuth deflection amplifier 240*a* controlling the horizontal plates of tube 207*a* and is also applied to an azimuth blanking signal generator 245*a* which cuts the tube off during the azimuth retrace interval.

While the circuits of Fig. 2*a* are arranged to provide a "B" display, it will be understood that other displays may be utilized such as A, J, or PPI displays. The "B" display is preferred, however, due to the simplicity in scanning circuits required as well as the fact that reference range in azimuth signals are quite readily encoded in a visual manner obviating the necessity of additional electronic reference signal generating circuits as explained above. Furthermore, the azimuth resolution at short ranges is better for the "B" display than the PPI display.

It should be apparent that the scanning operation is determined by the type of presentation selected in defining the circuits of Fig. 2*a*. Thus where the preferred B display is utilized, the operation of the circuits of Fig. 2*b* is performed along corresponding linear azimuth and range coordinates. However, the scanning rate is independent of that of the rate of display and the scanning operation need not be synchronized with the remote radar scanning rate due to the utilization of the storage means in accordance with the invention.

Thus while both the circuits of Figs. 2*a* and 2*b* may utilize local 60-cycle power as a convenient common frequency source, there are otherwise no common signal connections between the circuits for the purpose of synchronization.

The circuits of Fig. 2*b*, like those of Fig. 2*a*, may be conventional except for a few modifications introduced for the purpose of the invention. Thus the scanning and storage device is indicated to be a vidicon 207*b* such as that described in an article entitled "The Vidicon Photoconductive Camera Tube," by P. K. Weimer et al., in volume 23 of Electronics, on page 70, May 1950. A lower accelerating voltage is utilized than is conventional practice since this provides the desired storage characteristic.

The output signals produced by tube 207*b* are applied to a preamplifier 209*b*, the preamplifier signals being combined with flyback blanking signals produced by a generator and mixer 211*b* which receives signals from a range sweep generator 213*b* and azimuth sweep generator 215*b*. Circuit 211*b* provides a signal which blanks the vidicon retrace period to prevent transmission of these signals to the central station. The combined signals of preamplifier 209*b* and generator-mixer 211*b* are then applied to a narrow band amplifier 217*b* and thence to a peak limiter circuit 219*b*. These signals may then be utilized directly as "compressed" video data or may be standardized in a standardizer circuit 221*b*, a switch 222*b* being shown to indicate that an alternate choice is available. It will be understood, of course, that it is not necessary to have the alternate operation since either true video or standardized video may be utilized according to the invention.

These signals are then amplified and noise is eliminated in an amplifier and clamping circuit 225*b*. Amplifier 225*b* is coupled to a set of circuits 230*b* for carrier modulation and is also coupled to a differentiator circuit 250*b* which provides differentiated raw video for direct utilization without a carrier.

The compressed video signals which are to modulate the carrier are passed through a low pass filter 231*b* to a modulator circuit 232*b* which also receives the signals produced by a carrier oscillator 233*b*. The carrier modulated signals produced by circuit 232*b* are passed through a low pass filter 235*b* to a carrier side band mixer 237*b* which also receives signals produced by oscillator 233*b*. Filter 235*b* is selected to pass the desired portion of the lower and upper side bands, the technique of single side band transmission with a vestige of the other side band being preferred.

A selection may be made to transmit either the carrier mode derived from side band mixer 237*b* or differentiated raw video derived from circuit 240*b*. The selected signals are applied through a line amplifier and equalizer 250*b* to the telephone line coupling the encoder to the corresponding decoder at the central station.

It will be noted that the circuit of Fig. 2*b* also includes a range gate generator 260*b* for actuating range sweep generator 213*b* controlling vertical deflection amplifier 270*b*. Range gate generator 260*b* receives local 60-cycle power which is also utilized as a source for a synchronous motor and gear train 275*b* driving azimuth sweep generator 215*b* which controls horizontal deflection amplifier 280*b*. The reason a common source is utilized to actuate range generator 260*b* and a synchronous motor and gear train 270*b* is that it is necessary to have a fixed reference indicating the number of range sweep signals for each degree of azimuth. This reference data is required for the decoder at the central station so that the azimuth presentation rate may be adjusted accordingly.

Thus a suitable arrangement may be achieved by frequency dividing the 60-cycle source to provide a 20-sweep per second range sweep rate and by utilizing an appropriate gear train reduction to provide a 6 r.p.m. azimuth sweep rate. This means that 200 range sweeps are performed for each azimuth cycle of 360°.

Further specific analysis of the encoder of Fig. 2 is not considered to be necessary for the purpose of the present invention since a specific circuit arrangement which is suitable is amply described in the above-mentioned copending application by John Daspit. The present invention is concerned with system aspects rather than particular components such as the encoder, decoder, or assembly devices.

It is helpful, however, for the purpose of the present invention to consider the manner in which the radar video data is compressed so that it is suitable for transmission via narrow band facilities. A typical example will be illustrated to point out this technique. It will be assumed for the purpose of this example that the telephone facilities available will allow a band pass region of 3,000 cycles per second, being available, for example, in the range 300 to 3300 c.p.s.

It is assumed further that a range resolution of one-third mile is desired and that the total range scan at the remote station is 30 miles. Assuming then that 10% of the range scanning period is required for the range sweep flyback interval, it should be apparent that effectively 100 range spots are scanned during each sweep, as corresponding to the one-third mile resolution over 30 miles. This means that the range sweep rate which should be selected to provide the desired resolution within the compressed bandwidth of 3000 c.p.c. is 30 sweeps per second.

The azimuth sweep rate for the desired bandwidth is then determined on the basis of the spot diameter which is to be scanned and the desired number of range sweeps per spot. If the azimuth scan rate is selected to be 30° per second, it should be apparent that one range sweep occurs for each degree of azimuth and two or three range sweeps will be available for each beam spot having a diameter of 3° in azimuth. In this situation, then, the range resolution may be specified as one-third mile and the azimuth resolution as 1° per trigger.

In this manner it is apparent that a high degree of target resolution is possible even though the bandwidth facilities for transmission to the central station are somewhat limited.

*Decoder and display circuits 300*

(As shown generally in Fig. 3 and specifically in Figs. 3*a* and 3*b*)

Just as the encoders may be assumed to provide either raw video data or carrier more data, the decoders forming part of circuit 300 are indicated to have an alternate operation where either raw video or carrier demodulated video is made available. The signals received via telephone lines are applied to an amplifier 301 and thence to a demodulator 303 where the carrier operation is utilized. A switch 305 is indicated to allow selection between the raw and carrier video modes. It will be understood again that the invention may be practiced in either mode of operation.

A typical waveform of raw video signal is indicated at the input circuit of amplifier 301. There it will be noted that trigger signals mark the beginning of respective range sweeps and azimuth gated range marks indicate the reference azimuth point which may be zero azimuth. Although not shown in this waveform it will be understood that these reference signals are mixed with video target data which is to be displayed at the central station.

Amplifier 301 is also coupled to a pulse gate 307 which is biased so that it passes only the trigger signals. These trigger signals then are utilized to actuate a sweep gate 309 which controls a sweep generator 311.

Range sweep trigger signals gated through circuit 309 are also applied to a band pass filter 313. Filter 313 is operative to separate out the reference frequency indicating the number of range sweeps per azimuth. As indicated above a convenient reference is the 60-cycle power which is available. This reference frequency is applied to an amplifier 315 which is coupled through a resolver transformer 317 and a power amplifier 319 to a synchronous motor 321. Motor 321 rotates at the reference frequency rate and controls a resolver sine-cosine potentiometer 323, providing PPI deflection signals for the plates of the display tube 325. The gear reduction means associated with motor 321 is selected to provide the desired range-sweep-rate to azimuth-cycle-rate ratio, so discussed above.

The phase position of the azimuth-gated range marks as displayed on tube 325 may be adjusted by rotating the rotor portion of resolver transformer 317. This rotation changes the frequency of the signal applied to synchrous motor 321 very slightly and causes the reference azimuth marks to be rotated until they are properly aligned at the desired reference point which may be zero azimuth. The particular means for rotating the rotor of resolver transformer 317 is not shown since this may be achieved manually or automatically, whichever is preferred.

A PPI display is preferred since such a display is readily positioned in accordance with the geographical location of the encoder in the coordinates of the central station. It will be understood, however, that other displays may be utilized although the coordinate transformation may be somewhat more difficult.

As will be more fully understood after considering the assembly technique illustrated in Fig. 4 to be discussed below, the PPI data displayed in tubes 325 is somewhat distorted with respect to the central coordinates due to the fact that each display is referenced to its own zero range point and video data at short ranges appears brighter than that at long ranges.

Consequently, it is desirable to modulate the remote video data to be displayed on a PPI display so that the spots appear to have a more uniform variation throughout the range considered. This may be achieved by deriving a signal from sweep generator 311 corresponding to the range sweep signal and utilizing this signal to modulate the brightness of the received video data signals in a brightness time controlled modulator 327. A switch 328 is shown in order to illustrate again that this time modulation may not be desired, and therefore the alternative operation is possible.

It will be noted that sweep gate 309 also provides signals which are applied to a differentiator 330, a cancelling pulse generator 335 and a mixer 340. These signals are utilized to control blanking during the range-sweep retrace intervals and also to cancel the zero range mark which, of course, is no longer a zero range mark for the central station.

Although conventional circuits may be utilized to provide the components of decoders 300 such as those circuits shown in the above-mentioned reference by Donald G. Fink, a prefered set of circuits is shown in Figs. 3*a* and 3*b* where a common set of reference numerals is utilized so that these circuits may readily be referred to the general block diagram of Fig. 3.

Circuit values suitable for these circuits are shown in order to aid those skilled in the art in practicing the invention and waveforms occurring at various points are indicated to illustrate a typical operation. In general these circuits are conventional; further discussion therefore is not deemed to be necessary. One variation which is important to note, however, is that demodulator 303 is a doubly balanced circuit based upon principles more fully described in the above-mentioned copending U.S. patent application by John Daspit. A more detailed description of this circuit may be found in this copending application.

*Assembly and coordinate transformation means*
(As shown in Fig. 4)

In order to illustrate a typical assembly problem, it is assumed that there are three remote radar displays provided in corresponding tubes **325*a*, 325*b* and 325*c*, forming part of corresponding decoder circuits 300**, where the geographical locations of the corresponding remote radars and scanning areas do not overlap. These displays may then be optically assembled by physically positioning the displays in accordance with their geographical location in the central station coordinates. In order to illustrate a simple example, it is assumed that each of the remote radars is at a common radius point $R_1$ from the central installation. Furthermore, it is assumed that each of the remote radars has a common scanning radius $R_2$. Finally, it will be noted that it is assumed that the radars are positioned at 0°, 120°, and 240° azimuth with respect to the central radar coordinates.

A remote radar display **325*d* is also shown indicating the possibility of an overlapping area. The optical assembly in this case is achieved by reflecting the display from a fully aluminized mirror 401 and a partially aluminzied miror 402 to an assembly tube and preamplifier device 405. The partially aluminized mirror, it will be noted, also passes displays 325*a*, 325*b* and 325*c*. This assembled display, arranged in the coordinates of the central station, is then scanned by the vidicon tube, the scanning rate being synchronized with central radar trigger signals. These trigger signals are applied to a sweep and gate generator 410 providing range sweep signals which are passed through a PPI resolver 420. Resolver 420 is rotated at the rate of the central radar azimuth under the control of a servo-follower sine potentiometer 430** which receives central radar synchro data.

Resolver 420 then provides the required rotating sweep signals in terms of the central coordinates. The notation $R_c \cos \phi_c$ and $R_c \sin \phi_c$ represents the sine and cosine components of the central range component $R_c$ as resolved about the central azimuth angle $\phi_c$. These signals are then utilized to control a deflection amplifier 435 which actuates the vidicon beam to scan the assembled display.

It will be noted that the circuit of Fig. 4 also includes a vidicon control circuit 440 providing the desired accelerating and focus voltages and the like providing the required storage characteristics. In the assembly unit, as in the encoders, the vidicon must retain the assembled display for at least the period of a complete azimuth cycle, which may be on the order of 15 seconds.

The output signals produced by the vidicon tube then represent the video data of the remote radars in the central station coordinates. These signals are applied to an amplifier and spectrum emphasis circuit 450 and thence to a mixer stage 460 which also receives central radar video. The output signals of stage 460 are applied to a central radar display tube 470 providing a composite display of remote and central radar in the central radar coordinates.

In referring to tube 470 it will be noted that the composite assembled display which results is positioned in accordance in its true geographical location with respect to the central station. In this maner a central display is obtained without the necessity of complicated transformation circuits, such as computer circuits. Furthermore, the central radar assembly and display circuits need not be synchronized with the remote radars and may operate at different range and azimuth rates. In a typical installation the central radar range sweep rate may be of the order of 400 sweeps per second and the azimuth rate of the order of 4 cycles per minute or one every 15 seconds.

It is not considered necessary to illustrate specific circuits suitable for the assembly means of Fig. 4 since these circuits are quite conventional and furthermore may be similar to other circuits shown herein or incorporated by reference to the above-mentioned copending application by John Daspit.

From the foregoing description it should now be apparent that the present invention provides an efficient solution to the data assembly problem inherent in any radar network or other video scanning arrangement where a plurality of remote scanning devices are utilized to cover separate areas. The solution provided by the invention has the particular feature of allowing the transmission of video data from the remote locations over narrow band facilities, such as telephone lines, to a central station.

It will be understood that while the invention is particularly useful when utilized in radar systems, it may also find application where it is necessary to assemble other visual displays, such as television displays, at a central location. Thus the concept of coordinate transformation by optical means and scanning at the central station according to the central coordinates may be utilized to assemble video data received from a plurality of remote television installations rather than radar installations.

It has been pointed out that the utilization of the invention provides two general applications which are extremely useful. In one situation the invention allows the assemblage of video data relating to information detected over an extensive area, without the loss of the information resolution available at the remote locations. Furthermore, this video data may be maintained at a high order of resolution even though it is necessary to utilize narrow band transmission facilities to carry the information to the central station.

The other general application which has been pointed out is utilization of the invention to detect video data in areas which are "blind" to the central station. It will be understood, however, that these illustrations are not intended to limit the scope of the invention since a multitude of other applications will be apparent to those skilled in the art.

It should now be apparent that the technique of information storage which is employed according to the invention provides an efficient means for obviating the necessity for complex mechanical or electronic synchronization between central and remote stations. Thus the remote radar scanning rate may be completely independent of that at the central station and need not be synchronized therewith in any direct manner.

While the vidicon tube has been pointed out as a preferred means for providing scaning as well as the required storage characteristic, according to the invention, other means will be apparent to those skilled in the art. For example, the vidicon camera may be replaced with a conventional TV camera such as an image-orthicon if the display tube itself has the desired storage characteristic. Thus a Graphechon display tube may be used which has the desired storage characteristic. Furthermore, the invention also contemplates that the storage device utilized in the encoder may not be a storage tube. For example, the invention may be practiced by utilizing a magnetic drum to store the video data for an azimuth cycle. The storage operation will allow the "compression" of the video data according to the invention although a visual display will not be available at the encoding station. Once the encoding has been accomplished, moreover, the compressed video signal provided may appear precisely similar to those obtained through the utilization of a storage tube.

While specific circuits have been illustrated herein, and have been incorporated by reference to certain copending applications, it will be understood that the invention is not so limited although the particular circuits described are preferred in the practice of the invention.

While a few important variations which are possible without departing from the spirit of the invention have been pointed out, it will be understood that a multitude of other variations exist which will be apparent to those skilled in the art.

What is claimed is:

1. A system for remote radar data transmission and coordinated assembly at a central station where the data received is to be transformed to the coordinates of the central station, said system comprising: a plurality of first means for receiving respective remote radar data signals and for producing corresponding encoded signals based upon the respective remote coordinates; a corresponding plurality of second means at the central station responsive to said encoded signals, respectively, for decoding said signals and providing a corresponding plurality of visual displays; third means for providing a composite visual presentation of said visual displays based upon the respective geographical locations of the associated remote radars; and fourth means for scanning said composite visual presentation in the coordinates of the central station and in synchronism with central radar reference signals thereby to produce transformed video data signals representing the remote radar data in the coordinates of the central station, said transformed data being suitable for direct combination with the central radar video.

2. A system for transmitting remote video data signals to a central station over narrow band facilities, the information received at the central station being transformed into central video data in the coordinates of the central station, said system comprising: encoding means for receiving the remote video data signals and for compressing said data signals to a form suitable for transmission through the narrow band facilities; decoding means at the central station for receiving the compressed video data signals and for producing corresponding reference and display signals based upon the remote coordinates; optical translation and display means responsive to said reference and display signals for providing a visual display of the remote video data positioned according to the coordinates of the central station; and scanning means for translating said visual display into the central video data signals corresponding to remote video data translated to the central coordinates.

3. A system for remote video data transmission and coordinated assembly at a central station, where no mechanical or electronic synchronism is required between the remote and central stations, said system comprising: first means for translating the remote video data into corresponding reference and information signals suitable for transmission to the central station; second means for receiving said reference and information signals at the central station, and for translating these signals into a corresponding visual display representing the remote video data in the coordinates of the central station; and third means for scanning said visual display in synchronism with central reference signals, indicating the central scanning cycle, to produce corresponding central video data signals indicating the remote video data transformed to the central coordinates; at least one of said second and third means including means for storing signals representing said visual display for a period corresponding to said central scanning cycle, thereby obviating the necessity of synchronism between said remote and central stations.

4. A method for remote video data transmission and coordinated assembly at a central station where the data received is to be transformed to the coordinates of the central station, said method comprising the following steps: translating the remote video data signals into corresponding encoded signals based upon the remote coordinates; decoding the encoded signals at the central station to provide reference and display control signals to utilizing the reference and display control signals to present a central visual display where the remote video data is presented in a position corresponding to the geographical location of the remote stations; and scanning the central visual display in accordance with central reference signals to produce transformed video data signals representing the remote video data in the coordinates of the central station.

5. A method for transmitting remote video signals to a central station over narrow band facilities, the information received by the central station being transformed into central video data in the coordinates of the central station, said method comprising the following steps: encoding and compressing the remote video data signals by storing these signals for a period corresponding to the remote scanning rate and by scanning the signals at a rate suitable for providing signal frequencies suitable for transmission through the narrow band facilities available; decoding the encoded signals at the central station to produce corresponding reference and display signals based upon the remote coordinates; optically translating and displaying the reference and display signals to provide a central video display of the remote video data positioned according to the coordinates of the central station; and scanning said visual display to translate said display into central video data signals corresponding to remote video data signals translated to the central coordinates.

6. A method for remote video data transmission and coordinated assembly at a central station where no mechanical or electronic synchronism is required between the remote and central stations, said method comprising the following steps: translating the remote video data into corresponding reference and information signals suitable for transmission to the central station, receiving said reference and information signals and translating these signals into a corresponding visual display representing the remote video data in the coordinates of the central station, and scanning said visual display in synchronism with central reference signals indicating the central scanning cycle, to produce corresponding central video data signals indicating the remote video data transformed to the central coordinates.

7. In a system for remote video data transmission and assembly at a central station where the remote video data is translated at a remote point into corresponding reference and information signals suitable for transmission to the central station, the central station including means for decoding the reference and information signals into corresponding control signals which may be utilized to actuate a visual display device; assembly and coordinate transformation means comprising: first means responsive to the control signals for translating these signals into a corresponding visual display representing the remote video data, said first means providing the visual display in a position corresponding to the geographical location of the remote point; second means for scanning the visual display provided by said first means, in synchronism with central reference signals indicating the central scanning cycle, to produce corresponding central video data signals; and third means responsive to said central video data signals for displaying said signals to provide a coordinated display of the remote video data referenced to the central coordinates and reference signals.

8. The assembly and coordinate transformation means defined in claim 7 wherein said second means includes a vidicon tube and optical coupling means for presenting said visual displays of remote video data to said vidicon tube, said vidicon tube being actuable to scan said display in synchronism with applied signals representing central reference signals.

9. In a system for transmitting remote video data signals from a remote station to a central station over narrow band facilities where the remote video data signals are compressed to form signals suitable for transmission through the narrow band facilities and the central station includes decoding means receiving the compressed signals to produce corresponding reference and display signals; means for assembling and transforming the coordinates of the remote video data comprising: display means responsive to said reference and display signals for providing a visual display of the remote video data positioned according to the coordinates of the central station; scanning means for translating said visual display into central video data signals corresponding to remote video data translated to the central coordinates; at least one of said display means or scanning means including a storage device for retaining said visual display for a period corresponding to the central scanning cycle, thereby obviating the necessity of synchronism between the remote and central stations; and means for providing a composite output display representing the central video data signals.

10. The means for assembling and transforming the coordinates of remote video data, as defined in claim 9, wherein said scanning means includes a vidicon tube providing the required storage device, said tube being actuable in accordance with central reference signals to scan the visual display of the remote data signals positioned according to the coordinates of the central station.

11. A method for assembling and transforming the coordinates of remote video data received from a plurality of remote points without the necessity of complicated translation steps, said method comprising the following steps: translating the remote video data signals into a plurality of corresponding visual displays, arranging said visual displays into physical positions corresponding to the geographical locations of the corresponding remote points, optically coupling said display to a scanning device to allow the translation of said display into corresponding central video data signals, and redisplaying said central video data signals on a composite display representing the remote video data in the central coordinates.

12. A system for remote video data transmission and coordinated assembly at a central station where the data received is to be transformed to the coordinates of the central station, said system comprising: a plurality of remote encoder circuits for translating received video information into compressed video data suitable for transmission through narrow band facilities; a corresponding plurality of decoding means for receiving said compressed signals and for producing representative reference and display control signals; a plurality of display devices responsive to said reference and display control signals, respectively, for producing a corresponding number of remote video data displays, said displays being arranged in a manner representative of the geographical location of said encoding means; means including an optical coupling link for translating said visual displays into central video data signals corresponding to said remote video data translated to the central coordinates.

13. The system defined in claim 12 wherein said encoding means includes a display device and means for actuating said device to provide a visual display of the reference signals required for said decoding means; and wherein said encoding means also includes a scanning device for translating said visually displayed reference signals into corresponding electrical signals, thereby obviating the necessity of mechanical or electronic coupling between remote facilities providing the video data signals and the encoding means.

14. A surveillance system comprising: a plurality of spaced, stationary, ground-based radar stations; a separate storage device for each of said stations to display visually the relative positions of objects detected thereby; means to support said storage devices in the same relative positions as stations corresponding thereto; a television camera to scan all of said storage devices simultaneously; and a cathode-ray tube indicator responsive to the output of said camera to display all of the information recorded on said storage devices.

15. A surveillance system comprising: a plurality of spaced, stationary, ground-based radar stations; a separate cathode-ray tube for each of said stations to display visually the relative positions of objects detected thereby; means to support said cathode-ray tubes in the same relative positions as stations corresponding thereto; a television camera to scan all of said cathode-ray tubes simultaneously; and a cathode-ray tube indicator responsive to the output of said camera to display all the information recorded on said cathode-ray tubes.

16. A surveillance system comprising: a central radar station including means to produce signals to control space scanning thereof in the vicinity thereof; a plurality of remote, spaced, stationary ground-based radar stations; a separate storage device for each of said remote stations to display visually the relative positions of objects detected thereby; means to support said storage devices in the same positions relative to said central station as the other stations corresponding thereto; a television camera to scan all of said storage devices substantially simultaneously; means responsive to said central radar station space scanning control signals to cause said camera to scan said storage devices in synchronism with the space scanning of said central radar system; and a cathode-ray tube indicator to display not only all the information recorded on said storage devices, but also the positions of objects detected by said central station.

17. A surveillance system comprising: a central radar station including an antenna; means to rotate said antenna in azimuth; a plurality of remote, spaced, stationary, ground-based radar stations; a separate storage device for each of said remote stations to display visually the relative positions of objects detected thereby; means to support said storage devices in the same position relative to said central station as the other stations corresponding thereto; a television camera to scan all of said storage devices substantially simultaneously; means to cause said camera to scan all of said storage devices radially in the direction in which said antenna faces and to change the radial scanning direction thereof in synchronism with rotation of said antenna; and a cathode-ray tube indicator to display not only all the information recorded on said storage devices, but also the position of objects detected by said central station.

18. A surveillance system comprising: a central radar station including an antenna; means to cause said antenna to radiate pulses of electromagnetic energy; means to rotate said antenna in azimuth; a plurality of remote, spaced, stationary, ground-based radar stations; a separate storage device for each of said remote stations to display visually the relative positions of objects detected thereby; a television camera to scan all of said storage devices substantially simultaneously; means to cause said camera to scan said storage devices radially in the direction in which said antenna faces starting initially in synchronism with and upon radiation of said pulses and to change the radial scan direction of said camera in synchronism with rotation of said antenna; means to combine the video output of said central station with that of said camera; and a cathode-ray tube indicator responsive to the output of said combining means to display not only all the information recorded on said storage devices, but also the positions of objects detected by said central station.

19. A surveillance system comprising: at least two spaced, stationary, ground-based radar stations; a separate storage device for each of said stations to display visually the relative positions of objects detected thereby; means to support said storage devices in the same relative positions as stations corresponding thereto; a television camera to scan both of said storage devices substantially simultaneously; a partially aluminized mirror to transmit light defining an image of the information stored on one of said storage devices to said camera and to reflect light defining an image on the other of said storage devices toward said camera; and a cathode-ray tube indicator responsive to the output of said camera to display all the information recorded on said devices.

References Cited in the file of this patent

UNITED STATES PATENTS

| | | |
|---|---|---|
| 2,073,370 | Goldsmith et al. | Mar. 9, 1937 |
| 2,307,029 | Elm | Jan. 5, 1943 |
| 2,412,670 | Epstein | Dec. 17, 1946 |
| 2,440,250 | Deloraine et al. | Apr. 27, 1948 |
| 2,568,166 | Perry | Sept. 18, 1951 |
| 2,571,386 | Sarnoff | Oct. 16, 1951 |
| 2,626,390 | Duke | Jan. 20, 1953 |
| 2,704,816 | Pernsler | Mar. 22, 1955 |

OTHER REFERENCES

"Teleran," by D. H. Ewing et al. RCA Review, vol. VII, December 1946, No. 4. Published by RCA, pp. 601–621; page 614 particularly relied upon.

UNITED STATES PATENT OFFICE

CERTIFICATE OF CORRECTION

Patent No. 2,972,141 February 14, 1961

Edward J. Barlow et al.

It is hereby certified that error appears in the above numbered patent requiring correction and that the said Letters Patent should read as corrected below.

Column 1, line 59, for "remote" read -- remoted --; column 3, line 21, before "present" insert -- is --; column 5, line 25, strike out "and"; column 7, line 70, for "c.p.c." read -- c.p.s. --; column 8, line 6, before "trigger" insert -- range --; line 16, for "more" read -- mode --; lines 57 and 58, for "synchrous" read -- synchronous --.

Signed and sealed this 26th day of December 1961.

(SEAL)
Attest:

ERNEST W. SWIDER
Attesting Officer

DAVID L. LADD
Commissioner of Patents

USCOMM-DC